N. S. McEWEN.
TIMING DEVICE FOR CAMERAS.
APPLICATION FILED JULY 7, 1917. RENEWED SEPT. 10, 1919.
1,339,117.
Patented May 4, 1920.
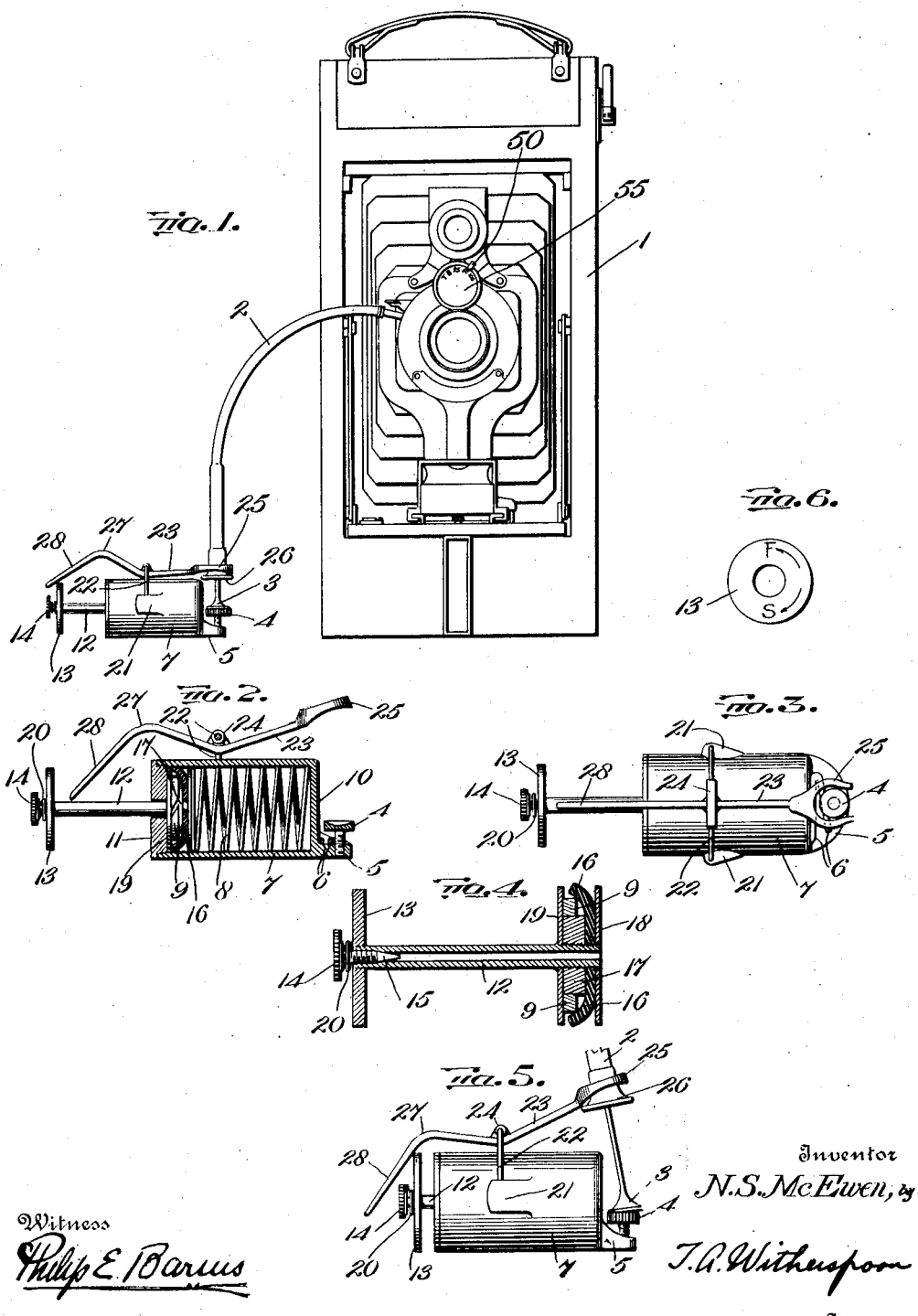

UNITED STATES PATENT OFFICE.

NORMAN S. McEWEN, OF NASHVILLE, TENNESSEE.

TIMING DEVICE FOR CAMERAS.

1,339,117. Specification of Letters Patent. Patented May 4, 1920.

Application filed July 7, 1917, Serial No. 179,257. Renewed September 10, 1919. Serial No. 322,985.

*To all whom it may concern:*

Be it known that I, NORMAN S. McEWEN, a citizen of the United States, residing at Nashville, in the county of Davidson and State of Tennessee, have invented certain new and useful Improvements in Timing Devices for Cameras; and I do hereby declare the following to be a full, clear, and exact description of the invention, such as will enable others skilled in the art to which it appertains to make and use the same.

This invention consists of timing devices for cameras and has for its object to provide an apparatus of this nature which will be simple in construction, inexpensive to manufacture, and more certain in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is an elevational view of a camera with this invention applied thereto;

Fig. 2 is a longitudinal sectional view of the timing device detached from the camera;

Fig. 3 is a plan view of the parts shown in Fig. 2;

Fig. 4 is a longitudinal sectional view of the piston and hollow piston rod illustrated in Fig. 2;

Fig. 5 is a side elevational view of the parts shown in Fig. 3 when the timing device is set for action; and Fig. 6 is a view of the disk carried on the outer end of the hollow piston rod indicating the directions in which the screw threaded valve member should be turned to regulate the time of exposure.

1 indicates any suitable camera provided with the usual flexible tubing 2 having the thumb piece 3 adapted to control the operation of the shutter not shown. 4 indicates a screw member on which the controlling member 3 of the shutter rests, 5 a lug supporting said screw member, 6 a spring or other lock for holding the screw member 4 in its adjusted position. 7 a cylinder provided with a spring 8, a piston 9, a closed end 10 and a disk 11 perforated to accommodate the hollow piston rod 13, and conveniently screw threaded into the end of the cylinder 7 as shown.

The said hollow piston rod 12 is provided at its outer end with the disk 13, see Fig. 6, having the symbols F and S or other suitable means for indicating fast and slow so that the operator may know in what direction to turn the head 14 of the screw threaded valve stem 15, in order to control the escape of air through the hollow piston rod 12. The said piston 9 is conveniently provided with the inverted cup-shaped member 16 which closely fits the interior of the cylinder 7, and thus makes a tight joint. It is further provided with the spring member 17 and disks 18 and 19 to steady the movement of the piston as well as to make its operation more certain.

The screw threaded valve 15 is surrounded by a spring 20 which serves to yieldingly hold the valve in any position it may be set, and thus prevent its working loose. 21 represents suitable lugs or other members rigid with the cylinder 7, to which the pivot member 22 may be attached, and to said pivot member is conveniently pivoted, as at 24, the lever 23 provided with a fork 25 at one end adapted to straddle the extreme bell-shaped end 26 of the pipe 2. Said lever 23 is further sharply bent as at 27 to provide the comparatively straight portion 28 against which the disk 13 carried by the piston rod 12 may take.

The operation of my improved timer will be clear from the foregoing but may be briefly summarized as follows:—

When it is desired to operate the shutter of the camera after a given time has elapsed, the push button 3 of the tube 2 is seated upon the screw 4 and the forked end 25 of the lever 23 is made to embrace the bell-shaped member 26 of the said tube 2, as is illustrated in the drawings. The head 14 of the screw threaded valve 15 having been previously adjusted to the proper point, pressure may be exerted thereon or upon the disk 13 to press home the piston 9 or to bring the parts into the position shown in Fig. 5.

The parts being in the position shown in Fig. 5, upon releasing the pressure on the head 14, the disk 13 will, under the action of the spring 8, move toward the left as seen in said figure, and will thus traverse the straight portion 28 of the lever 23, and depress the forked end 25 of said lever, thus causing the bell shaped member 26 to approach the thumb member 3 of the shutter controlling apparatus, and when the said members 3 and 26 have been sufficiently approached, the said shutter will be tripped in the manner well known.

Since it takes a period of time, depending upon the position of the valve 15, for the disk 13 to thus traverse the portion 28 of the lever 23, it is evident that the operator may rest the camera on any suitable support, adjust the parts as above indicated, and after releasing the piston rod 12 and disk 13 he may then go in front of the camera and take any desired position in the picture before the shutter is tripped.

It is also evident that should the camera be provided with a time exposure device, such for example, as may be adapted to make what are known as "bulb" exposures, and which will hold the shutter open so long as the parts 3 and 26 are pressed together, then this apparatus may also be employed for time exposures. That is to say, by properly adjusting the screw 4 and the valve 15, any periods of time may be selected during which said parts 3 and 26 will be pressed together, and therefore in such cases the operator may cause the shutter to be held open different periods of time to correspond with the character of the light available at the time and place of exposure. The usual hand or pointer 50 may be conveniently adjusted over the dial 55, to the mark indicating the setting of the shutter for a "bulb" exposure in the manner well known, when it is desired to make a time exposure.

Stated in other language the lever 23 constitutes a movable means for pressing the member 26 toward the screw 4, the valve 15 constitutes a means for regulating the speed at which the claw 25 of said lever travels and therefore the time allowed the operator to take his position in front of the camera, while the screw 4 constitutes a means for controlling the distance said claw 25 will travel, and therefore, the time the shutter will be held open.

In other words, by properly adjusting the members 4 and 15, the delays in tripping the shutter as well as the times of exposure may be regulated to a nicety. As the piston 9 moves to the left as seen in Fig. 2, any air that may be trapped in the cylinder 7 may conveniently pass out through the orifice in the disk 11.

It is obvious that those skilled in the art may vary the details of the construction as well as the arrangement of parts without departing from the spirit of the invention, and therefore, I do not wish to be limited to the above disclosure except as may be required by the claims.

What I claim is:—

1. In a timing device for cameras the combination of a cylinder; a shutter-control actuating lever pivotally carried by said cylinder; means on said lever to engage one portion of the shutter controlling means carried by the camera; adjustable means on said cylinder to engage another portion of said shutter controlling means; a spring in said cylinder; a piston having a piston rod in said cylinder adapted to be moved by said spring; and means controlled by said piston rod for rocking said lever about its pivot and thereby causing said portions of said shutter controlling means to approach one another, substantially as described.

2. In a timing device for cameras the combination of a cylinder; a piston fitting said cylinder; a spring in said cylinder to move said piston; a hollow piston rod admitting air to said cylinder behind said piston; an adjustable valve controlling the admission of air to said cylinder; a shutter-control actuating lever provided with an angularly disposed portion and with means to engage one member of the shutter controlling means carried by the camera, pivoted to said cylinder; adjustable screw threaded means on said cylinder adapted to engage another member of said shutter-controlling means; means for locking said adjustable means in any desired position; and a disk rigid with said piston rod, adapted to engage and disengage said angularly disposed portion of said lever, whereby said shutter control members may be actuated to secure instantaneous and time exposures as desired, substantially as described.

In testimony whereof I affix my signature, in presence of two witnesses.

NORMAN S. McEWEN.

Witnesses:
FRANK A. SMITH,
P. M. BURCHUL.